United States Patent Office 3,469,993
Patented Sept. 30, 1969

3,469,993
LIPOLYZED MILK FAT PRODUCTS
Douglas John Pangier, Madison, Wis., assignor, by mesne assignments, to Miles Laboratories, Inc., Elkhart, Ind., a corporation of Indiana
No Drawing. Filed July 11, 1966, Ser. No. 563,986
Int. Cl. A23c 23/00; C12d 1/02
U.S. Cl. 99—59                                                3 Claims

ABSTRACT OF THE DISCLOSURE

Improved lipolyzed milk fat products can be obtained by treating a milk fat medium with a lactic acid-producing bacterial culture and then contacting the milk fat medium with a lipase enzyme system to effect lipolysis.

---

This invention relates to milk fat products and a novel process for treating milk fat products to develop therein desired flavors. More particularly, the invention relates to milk fat products and a novel method of changing, improving and controlling the flavor of such products.

It is common practice in the dairy industry to treat milk fats with lipase enzymes to produce free fatty acids by hydrolysis of the fats. The free fatty acids in turn produce desirable flavors so that the lipolyzed milk fat is suited for use in products where a butter flavor or a flavor of controlled rancidity is desired, such as in baked goods and candy products, particularly chocolate candy products. The milk fat which is treated with the lipase enzymes can be in many different forms such as in whole milk, whey cream, a butter and water emulsion, cream or the like. The total amount of the fatty acids produced in the milk fat is dependent upon time and temperature of treatment with the lipase enzymes, quantity of fat available, the amount of the lipase enzymes used, as well as the type or source of the lipase enzyme. The flavors produced by the lipase enzymes are the typical flavors of free fatty acids. However, the ratio of the various fatty acids produced will characteristically depend upon the origin of the enzyme employed for lipolysis. For example, the lipase enzymes extracted from the gullet of a calf will generally produce a higher ratio of short chain fatty acids (6 or less carbon atoms), while pancreatic lipase generally produce a higher ratio of long chain fatty acids such as oleic or stearic acid. These long chain fatty acids exhibit soapy flavors which are usually undesirable in food products.

The lipase enzymes are usually not sterile products, since heat will destroy the enzymes, and accordingly contain many contaminant micro-organisms common to the gland of the animal from which the lipase enzymes are obtained. In manufacturing a lipolyzed milk fat product from a material of low fat content, such as, for example, a cream containing 12% fat, using the dried tissue of the gullet of a calf, lipolysis occurs relatively slow with the result that the undesirable contaminent bacteria can grow and produce off-flavors before the lipase enzymes hydrolyze the fat sufficiently to produce quantities of free fatty acids which would inhibit the growth of the contaminant organisms. Accordingly, in prior art practice it is generally necessary to employ a preservative such as sodium benzoate to prevent this wild growth of the contaminant bacteria which produce undesirable flavors. The addition of a chemical preservative is undesirable from a marketing standpoint since a natural product without chemical additives is generally preferred by the ultimate users of the product, such as candy producers.

It is a principal object of the present invention to provide a new method of treating milk fat products with lipase enzymes to produce therein free fatty acids.

It is a further object of the present invention to provide a new method of lipolyzing milk fat products wherein the above-indicated disadvantages of the prior art processes are eliminated.

In accordance with the present invention, a milk fat product which is to be lipolyzed by means of lipase enzymes to produce free fatty acids is first treated with lactic acid-producing bacteria to produce therein lactic acid, after which the lactic acid acidified milk fat medium is treated with lipase enzymes in conventional manner. By first treating the milk fat product with lactic acid-producing bacteria, it is not necessary to use chemical additives during the subsequent lipolysis to prevent growth of contaminant organisms, and in addition the flavor of the end product is greatly enhanced.

In carrying out the present invention according to one particular embodiment thereof, a milk fat medium, such as cream or any milk fat medium susceptible to lipolysis, is inoculated with a lactic acid-producing bacteria culture. The inoculated milk fat medium is then incubated at a temperature suitable for development of lactic acid. Lactic acid is produced by the fermentation of the lactose or milk sugar. The optimum incubation or cultivation temperature for a particular species of lactic acid-producing bacteria or a particular mixture thereof is well known in the art and generally ranges from about 70 to 115° F. Incubation of the milk fat medium with the lactic acid-producing bacteria culture is continued until a desired level of flavoring components and organic acids is produced by the bacteria. This is determined by the organoleptic properties desired in the product, but in general incubation of the milk fat medium with the lactic acid-producing culture is terminated when the lactic acid content of the medium is within the range of about 0.3 to 1.8% by weight, preferably 1.0 to 1.2%.

The point at which to terminate incubation of the milk fat media with the lactic acid bacteria can be determined by organoleptic and/or chemical analysis and when the desired acidity has been obtained, the fermentation can be halted by heating the milk fat medium to a temperature which will stop or inhibit further growth of the lactic acid-producing bacterial culture, such as, for example, a temperature of 170° F. Once the desired minimum lactic acid content is obtained in the milk fat medium and if there is no desire to limit the maximum production of lactic acid therein (this, of course, will depend upon the flavor desired in the product) it is not then necessary to heat the medium to stop further growth of the lactic acid bacterial culture, but instead the lipase enzyme system can be introduced. As the bacterial fermentation progresses, the lactic acid produced by the bacterial organisms begins to inhibit growth of the organisms and the fatty acids produced by the lipolysis in turn inhibit further growth of the bacteria. Thus, it is only necessary to take positive steps to terminate fermentation with the bacterial culture if, for organoleptic or other reasons, less than the maximum content of lactic acid is desired in the product. If heat is employed to terminate the growth of the bacterial culture and production of lactic acid, it is preferred to cool the milk fat medium to the temperature desired for incubation with the lipolytic enzymes.

Any of the known bacterial cultures which will produce lactic acid in milk fat products can be employed in the first step of the new process of the present invention. Thus, for example, the lactic acid-producing bacterial culture can comprise *Streptococcus lactis, Streptococcus cremoris, Streptococcus thermophilus, Lactobacillus bulgaricus, Lactobacillus acidophilus*, mixtures thereof and the like. These bacterial cultures are well known in the dairy industry for their ability to produce lactic acid in milk products and the optimum temperatures to employ for the production of lactic acid with a particular bacterial culture are likewise well known. In general, the fermentation with the lactic acid-producing bacteria will be carried out at a temperature in the range from about 70 to 115° F. The various species of lactic acid-producing bacteria vary somewhat in ability to produce lactic acid. *Lactobacillus bulgaricus* generally produces greater amounts of lactic acid and for this reason is preferred for use in accordance with the present invention. One practicing the present invention can readily determine the proper bacterial culture to employ to obtain a desired lactic acid content. For example, if the medium to be used for producing a cultured-lipolyzed product is a cream with a milk fat content of 35% and the level of lactic acid desired therein is 0.45% by weight, a culture of *Streptococcus lactis* can be used advantageously. This lactic acid content could be obtained in a period of 12 to 16 hours at an incubation temperature of 70–100° F. Similarly, if a lactic acid content of 1.0% were desired, then a culture with the properties of *Lactobacillus bulgaricus* could be used. Such a culture will generally produce a lactic acid content of 1.0% in about 12 to 16 hours at an incubation temperature of 90–102° F.

After the desired amount of lactic acid is produced in the milk fat medium by means of the lactic acid-producing bacterial cultures, the acidified milk fat medium is lipolyzed with a suitable lipase enzyme system. Lipolysis is carried out in conventional manner. The lipase enzyme employed can be any of the known animal, bacterial or fungal lipase enzymes normally used in the dairy industry for the production of fatty acids in milk fat products. In general, lipolysis is carried out by incubating the acidified milk fat medium with lipase enzymes at a temperature ranging from about 85 to 110° F., preferably 90 to 100° F., for a period of from about 18 to 36 hours or longer.

The flavor of the end product will vary somewhat with the particular lipase enzyme system that is employed, but those skilled in the art can routinely determine the particular lipase enzyme system to employ in accordance with this invention to obtain a desired product. It has been found that the lipase extracted from the gullet of a calf is admirably suited for producing lipolyzed milk fat products which are to be ultimately used as flavoring agents in candy and like products.

In a preferred embodiment the milk fat medium which is to be treated in accordance with the invention is first pasteurized or sterilized. Then, by addition of a known lactic acid-producing bacterial culture to the sterilized milk fat medium it is possible to eliminate virtually all contaminant micro-organisms. The lactic acid-producing organisms grow very rapidly at the proper incubation temperatures, easily outgrowing the contaminant organisms with the growth of the latter being inhibited by the lactic acid which is produced. Likewise, when the lipase enzyme system is introduced into the milk fat medium, the relatively high lactic acid content thereof will prevent or inhibit contaminant organisms inherently present with the lipase enzymes from growing and possibly producing undesirable flavors and by-products. Thus, by means of the invention a desired flavor in the finished product can be consistently obtained.

As is known, lipolysis of milk fat products with lipase enzymes, such as those obtained from animal tissues, produces fatty acids ranging from the 4 carbon chain butyric acid up to those containing 18 carbon atoms, such as stearic and oleic. The lipolyzed milk fats containing these fatty acids when used at a low level in a food product, such as candy, contribute to a certain extent a butter flavor. However, by first culturing the milk fat medium with a lactic acid-producing bacterial culture before lipolysis, it is possible to obtain a lipolyzed product having an enhanced butter flavor. The lactic acid and other flavoring agents such as diacetyl which are usually associated with the production of lactic acid apparently blend with and synergize the effect of the fatty acids providing a superior product for use in flavoring foodstuffs.

Analysis by gas chromatography showed the relative percentages of various free fatty acids in four lipolyzed milk fat media to be as follows:

| Milk Fat Medium | Caprylic | Capric | Lauric | Myristic | Palmitic | Palmitoleic | Stearic | Oleic |
|---|---|---|---|---|---|---|---|---|
| A | 9.90 | 16.3 | 16.5 | 21.7 | 20.0 | 4.08 | 2.12 | 9.48 |
| B | 4.83 | 7.09 | 5.35 | 14.9 | 29.0 | 3.76 | 11.7 | 23.3 |
| C | 8.56 | 15.5 | 16.0 | 20.5 | 20.6 | 4.75 | 2.65 | 11.4 |
| D | 7.92 | 15.5 | 16.3 | 21.4 | 22.5 | 4.77 | 2.41 | 9.18 |

The above milk fat media were treated as follows:

Medium A

A homogenized, pasteurized cream with a milk fat content of 35% was treated with calf lipase enzyme in a quantity of 0.5–1.5% by weight of the cream at a temperature of 90–100° F., until 5 grams of the cream titrated 15 milliliters of ½₀ N sodium hydroxide solution. The cream was then heated to 180° F. to destroy the enzyme and cooled to packaging temperature.

Medium B

A homogenized, pasteurized cream with a milk fat content of 35% was treated with a calf throat lipase enzyme and a pancreatic lipase enzyme in equal quantities, each corresponding to 0.5% of the total weight of the cream, at a temperature of 90–100 F. until 5 grams of the cream titrated 50 milliliters of a ½₀ N sodium hydroxide solution. It was then heated to 180° F. to destroy the enzyme and cooled to packaging temperature.

Medium C

A homogenized, pasteurized cream with a milk fat content of 35% was cultured with *Streptococcus lactis* at a temperature of 70–72° until a lactic acid content of 0.5% was obtained.

Calf lipase enzyme in an amount of 0.5%–1.5% by weight of the cream was then blended in and the cream was homogenized at 1000 pounds pressure and incubated at 90–100° F. until 5 grams of the cream titrated 25 milliliters of an ½₀ N sodium hydroxide solution. It was then heated to 180° F. to destroy the enzyme and cooled to packaging temperature.

Medium D

A homogenized, pasteurized cream with a milk fat content of 35% was cultured with *Lactobacillus bulgaricus* at a temperature of 100° F. until a lactic acid content of 1.0% was produced.

Calf lipase enzyme was then blended in and the cream was homogenized at 1000 pounds pressure and incubated at 90–100° F. until 5 grams of the cream titrated 30 milliliters of a ½₀ N sodium hydroxide solution. It was then heated to 180° F. to destroy the enzyme, and then cooled to packaging temperature.

The following represents one preferred specific embodiment of the present invention:

Two thousand pounds of sweet cream, with a fat content of 36%, is heated to 180° F. and held at that temperature for 20 minutes. It is then cooled down to 100° F. Two gallons of a skim milk culture of *Lactobacillus bulgaricus* ripened to an acidity of approximately 1% is added to the cream. This cream is then incubated until the lactic acid content is 1.0%, which generally requires about 14–20 hours.

When a 1% lactic acid content is obtained, 30 pounds of calf lipase enzyme is added. This is blended into the cream with constant agitation. The mixture of cream and lipase is then passed through a homogenizer at 1000–1500 pounds per square inch pressure. It is then allowed to incubate at a temperature of 100° F., until a final titratable acidity of 30 milliliters of 1/20 N sodium hydroxide for five grams of the cream is reached. This generally will take 20–36 hours. Then the cream is heated to 180° F. for 20 minutes to destroy the enzyme and bacterial culture. It is then cooled to a convenient packaging temperature, usually around 90° F. After packaging, the product is stored at refrigeration temperatures.

Certain advantages of the invention have been referred to above. An additional advantage is that by the present invention a cultured, lipolyzed milk fat product is obtained which in many instances will have a viscosity much lower than a similar milk fat product which has undergone only lipolysis. This is an important advantage from the commercial packaging standpoint. Thus, for example, a cream containing 35% milk fat when merely hydrolyzed with animal lipase enzymes, such as are obtained from the gullet of a calf, will generally give a lipolyzed product which is quite viscous and which can be dispensed only by scooping the product out of its container. However, if the same cream is first cultured with *Lactobacillus bulgaricus* in accordance with the invention, the finished product after the final hydrolysis will generally be found to have a much lower viscosity such that it is flowable at temperatures as low as 50° F. Such a product in use can be dispensed from large containers by pump or by gravity probe.

Those modifications and equivalents which fall within the spirit of the invention and the scope of the appended claims are to be considered part of the invention.

I claim:

1. A process for producing lipolyzed milk fat products which comprises treating a milk fat medium containing from about 12% to about 36% milk fat with a lactic acid-producing bacterial culture to produce in the medium a lactic acid content from about 0.3 to 1.8% by weight and then contacting the milk fat medium with a lipase enzyme system to effect lipolysis.

2. The process according to claim 1 wherein the lactic acid bacterial culture contains *Lactobacillus bulgaricus*.

3. A lipolyzed milk fat product resulting from the process of claim 1 having improved flavor, more consistency in composition and increased fluidity as compared to prior art lipolyzed milk fat products.

References Cited

UNITED STATES PATENTS

| | | | |
|---|---|---|---|
| 1,966,460 | 7/1934 | Otting | 99—24 |
| 2,169,278 | 8/1939 | Otting | 99—24 |
| 2,233,179 | 2/1941 | Otting et al. | 99—123 |
| 2,638,418 | 5/1953 | Kempf et al. | 99—56 |
| 3,072,488 | 1/1963 | Watts et al. | 99—54 X |
| 3,190,753 | 6/1965 | Claus et al. | 99—54 |

OTHER REFERENCES

Efthymiou et al.: Development of Domestic Feta Cheese, J. Da. Sci., 1964 (page 594).

Harper et al.: Lipase systems used in the manufacture of Italian cheese. General characteristics, J. Da. Sci., 1955, vol. 38 (page 92).

LIONEL M. SHAPIRO, Primary Examiner

D. M. NAFF, Assistant Examiner

U.S. Cl. X.R.

99—123